US012767054B2

(12) United States Patent
Trumble et al.

(10) Patent No.: US 12,767,054 B2

(45) Date of Patent: Oct. 20, 2026

(54) TAILGATE STEP

(71) Applicant: Scout Motors Inc., Tysons, VA (US)

(72) Inventors: Kenneth Trumble, Tysons, VA (US); Jason Scott, Tysons, VA (US)

(73) Assignee: Scout Motors Inc., Tysons, VA (US)

( * ) Notice: Subject to any disclaimer, the term of this patent is extended or adjusted under 35 U.S.C. 154(b) by 288 days.

(21) Appl. No.: 18/647,530

(22) Filed: Apr. 26, 2024

(65) Prior Publication Data

US 2025/0332999 A1 Oct. 30, 2025

(51) Int. Cl.
*B60R 3/02* (2006.01)

(52) U.S. Cl.
CPC .................................... *B60R 3/02* (2013.01)

(58) Field of Classification Search
CPC ................................................ B60R 3/02
See application file for complete search history.

(56) References Cited

U.S. PATENT DOCUMENTS

| | | | | |
|---|---|---|---|---|
| 3,853,369 | A * | 12/1974 | Holden | B60R 3/02 280/166 |
| 4,161,997 | A | 7/1979 | Norman | |
| 4,639,032 | A | 1/1987 | Barbour | |
| 4,846,487 | A | 7/1989 | Criley | |
| 4,848,821 | A | 7/1989 | Llewellyn | |
| 5,732,996 | A | 3/1998 | Graffy et al. | |
| 5,820,193 | A | 10/1998 | Straffon | |
| 6,422,342 | B1 | 7/2002 | Armstrong et al. | |
| 6,857,680 | B2 | 2/2005 | Fielding | |
| 6,905,158 | B1 | 6/2005 | Bastian | |
| 6,918,624 | B2 | 7/2005 | Miller et al. | |
| 6,942,272 | B2 | 9/2005 | Livingston | |
| 7,055,838 | B2 | 6/2006 | Lambie | |
| 7,090,276 | B1 | 8/2006 | Bruford et al. | |
| 7,234,750 | B1 | 6/2007 | Doolittle et al. | |
| 7,261,357 | B1 | 8/2007 | Bechen | |
| 7,264,253 | B1 | 9/2007 | Cummings | |
| D585,350 | S * | 1/2009 | Coletti | D12/203 |
| 7,530,619 | B1 | 5/2009 | Bruford et al. | |
| 7,673,922 | B1 * | 3/2010 | Grimes | B60R 3/02 280/166 |
| 7,896,419 | B2 | 3/2011 | Elliott et al. | |
| 8,182,013 | B1 | 5/2012 | Alvarado | |
| 8,444,201 | B1 | 5/2013 | Crawford et al. | |

(Continued)

FOREIGN PATENT DOCUMENTS

| | | | |
|---|---|---|---|
| AU | 2019204842 | A1 | 1/2021 |
| CA | 2972519 | A1 | 1/2019 |
| DE | 202015105315 | U1 | 11/2015 |

*Primary Examiner* — Lori Lyjak

(74) *Attorney, Agent, or Firm* — Meunier Carlin & Curfman LLC

(57) ABSTRACT

A tailgate step may include an actuation handle configured to be pivotably coupled to a vehicle tailgate. A tailgate step may include a drive link pivotably coupled to the actuation handle. A tailgate step may include a step support link pivotably coupled to the drive link and configured to support a step skin. A tailgate step may include a step surface coupled to and movable with the step support link between: a stowed position hiding the step surface and configured to align the step skin with a tailgate skin of the vehicle tailgate, and a deployed position with the actuation handle extending from the vehicle tailgate and configured as an assist device.

20 Claims, 9 Drawing Sheets

(56) References Cited

U.S. PATENT DOCUMENTS

| | | | | |
|---|---|---|---|---|
| 8,505,944 | B2 | 8/2013 | Genest et al. | |
| 9,517,711 | B2 | 12/2016 | Krajenke et al. | |
| 10,106,087 | B2 * | 10/2018 | Stojkovic | B60P 3/14 |
| 10,518,820 | B2 | 12/2019 | Spahn et al. | |
| 10,994,660 | B2 | 5/2021 | Ngo | |
| 11,260,796 | B2 | 3/2022 | Hemphill et al. | |
| 11,414,016 | B2 | 8/2022 | Bender | |
| 11,427,265 | B2 | 8/2022 | Williamson et al. | |
| 11,535,161 | B1 | 12/2022 | Walker | |
| 11,673,507 | B2 | 6/2023 | Verbridge et al. | |
| 2002/0070577 | A1 | 6/2002 | Pool et al. | |
| 2005/0088848 | A1 | 4/2005 | Miller et al. | |
| 2007/0096422 | A1 | 5/2007 | Dolan | |
| 2010/0181741 | A1 | 7/2010 | Webb | |
| 2010/0230209 | A1 | 9/2010 | Hughes et al. | |
| 2014/0203587 | A1 | 7/2014 | Krishnan et al. | |
| 2016/0311355 | A1 | 10/2016 | Krajenke et al. | |
| 2017/0361878 | A1 | 12/2017 | Loew et al. | |
| 2018/0065560 | A1 | 3/2018 | Krishnan et al. | |
| 2022/0001728 | A1 | 1/2022 | Nania et al. | |
| 2022/0009417 | A1 | 1/2022 | Kim et al. | |
| 2022/0097608 | A1 | 3/2022 | Patterson et al. | |
| 2023/0158958 | A1 * | 5/2023 | Ricketts | B62D 33/0273 280/166 |

* cited by examiner

TAILGATE STEP

BACKGROUND

This disclosure relates to tailgate steps for vehicles.

SUMMARY

In some aspects, the techniques described herein relate to a tailgate step including: an actuation handle configured to be pivotably coupled to a vehicle tailgate; a drive link pivotably coupled to the actuation handle; a step support link pivotably coupled to the drive link and configured to support a step skin; and a step surface coupled to and movable with the step support link between: a stowed position hiding the step surface and configured to align the step skin with a tailgate skin of the vehicle tailgate, and a deployed position with the actuation handle extending from the vehicle tailgate and configured as an assist device.

In some aspects, the techniques described herein relate to a tailgate step, wherein the drive link is a first drive link, further including a second drive link pivotably coupled between the step support link and the actuation handle.

In some aspects, the techniques described herein relate to a tailgate step, further including a base frame including a frame pin defining a frame pin axis, wherein the second drive link is coupled to the actuation handle and the frame pin so that the actuation handle and the second drive link rotate relative to the base frame relative to the frame pin axis.

In some aspects, the techniques described herein relate to a tailgate step, further including a base frame including a frame slide defining a frame slide axis, wherein the step support link is coupled to the drive link about a slide pin axis constrained on the frame slide axis by the frame slide.

In some aspects, the techniques described herein relate to a tailgate step, wherein the drive link includes a bearing slidingly coupled to the frame slide.

In some aspects, the techniques described herein relate to a tailgate step, wherein the step surface is configured to be parallel to a ground surface when in the deployed position.

In some aspects, the techniques described herein relate to a tailgate step, wherein the actuation handle is configured to be recessed into a tailgate frame when in the stowed position.

In some aspects, the techniques described herein relate to a tailgate step, wherein the tailgate step actuates between the stowed position and the deployed position using a four-bar linkage including the actuation handle, the drive link, and the step support link.

In some aspects, the techniques described herein relate to a tailgate step, wherein the actuation handle includes a locking feature selectively maintaining the tailgate step in the stowed position or the deployed position.

In some aspects, the techniques described herein relate to a four-bar linkage tailgate step including: an actuation handle configured to be pivotably mounted to a vehicle tailgate about a first axis and including a grip; a rotating drive link rotatably coupled to the actuation handle about the first axis; a step support link coupled to the rotating drive link; and a step surface coupled to the step support link, wherein the four-bar linkage tailgate step is arrangeable in a stowed position with the actuation handle and the step surface are within a tailgate skin, and wherein the four-bar linkage tailgate step is arrangeable in a deployed position with the actuation handle extending from the tailgate skin and providing an assist device, and the step surface extending from the tailgate skin.

In some aspects, the techniques described herein relate to a four-bar linkage tailgate step, further including a sliding drive link rotatably coupled between the actuation handle about a link-handle axis and the step support link about a slide pin axis.

In some aspects, the techniques described herein relate to a four-bar linkage tailgate step, further including: a base frame including: a frame pin defining a frame pin axis, the actuation handle and the rotating drive link coupled to the frame pin for rotation about the frame pin axis, and a frame slide defining a frame slide axis; and a bearing coupled to the sliding drive link about the slide pin axis, wherein the frame slide constrains the bearing to move along the frame slide axis.

In some aspects, the techniques described herein relate to a four-bar linkage tailgate step, wherein the actuation handle is configured to be recessed into a tailgate frame when in the stowed position.

In some aspects, the techniques described herein relate to a four-bar linkage tailgate step, wherein the actuation handle includes a locking feature selectively maintaining the four-bar linkage tailgate step in the stowed position or the deployed position.

In some aspects, the techniques described herein relate to a four-bar linkage tailgate step, wherein the step support link is structured to support a step skin and to align the step skin with the tailgate skin when the four-bar linkage tailgate step is arranged in the stowed position.

In some aspects, the techniques described herein relate to a vehicle tailgate including: a tailgate frame; a tailgate skin covering the tailgate frame; and a tailgate step including: a base frame rigidly coupled to the tailgate frame and including a frame pin defining a frame pin axis, and a frame slide defining a frame slide axis; an actuation handle rotatably coupled to the frame pin; a sliding drive link rotatably coupled to the actuation handle about a link-handle axis and including a bearing slidingly engaged with the frame slide and defining a slide pin axis; a rotating drive link rotatably coupled to the frame pin; and a step support link rotatably coupled to the sliding drive link about the slide pin axis, and rotatably coupled to the rotating drive link about a rotation pin axis, the step support link including a step surface and a step skin, wherein the tailgate step is actuatable between a stowed position and a deployed position, wherein when arranged in the stowed position, the step skin is aligned with the tailgate skin and the actuation handle is recessed within the tailgate frame, and wherein when arranged in the deployed position, the actuation handle provides an assist device and the step surface is positioned below and rearward of the tailgate frame.

In some aspects, the techniques described herein relate to a vehicle tailgate, wherein the actuation handle includes a locking feature selectively maintaining the tailgate step in the stowed position or the deployed position.

In some aspects, the techniques described herein relate to a vehicle tailgate, wherein the frame pin axis is perpendicular to the frame slide axis.

In some aspects, the techniques described herein relate to a vehicle tailgate, wherein the frame pin axis, the slide pin axis, the rotation pin axis, and the link-handle axis are parallel to and offset from one another.

In some aspects, the techniques described herein relate to a vehicle tailgate, wherein the step surface is configured to be parallel to a ground surface in the deployed position.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF DRAWINGS

Various implementations of the device and system are explained in even greater detail in the following drawings. The drawings are merely exemplary and certain features may be used singularly or in combination with other features. The drawings are not necessarily drawn to scale.

DETAILED DESCRIPTION

Following below are more detailed descriptions of concepts related to, and implementations of, methods, apparatuses, and systems for a tailgate step for the tailgate of a vehicle. In some implementations, the vehicle is an electric vehicle or a battery electric vehicle. The figures illustrate exemplary implementations in detail and the present disclosure is not limited to the details or methodology set forth in the description or illustrated in the figures. The terminology used herein is for the purpose of description only and should not be regarded as limiting.

As used herein the term "battery electric vehicle" means a vehicle (e.g., a passenger vehicle, a delivery vehicle, etc.) for use by humans or a self-driving vehicle that is powered entirely by a battery system including battery cells. In other words, no fossil fuels are utilized, no internal combustion engine is present in the vehicle, and no alternative forms of propulsion is provided (e.g., hydrogen fuel cells, etc.). In some implementations, features of this disclosure can be used with hybrid vehicles, such as plug-in hybrid vehicles, hybrid vehicles (e.g., full hybrid vehicles), mild hybrid electric vehicles, and range extended hybrid vehicles.

Referring to the figures generally, the various implementations disclosed herein relate to systems, apparatuses, and methods for a tailgate step that is integrated with a skin of a tailgate of a vehicle such as a battery electric vehicle or a hybrid vehicle. The tailgate step is actuated by a handle and a four-bar linkage system. The handle and four-bar linkage are movable between a stowed position and a deployed position. In the stowed position, an exterior surface of the tailgate step is flush with the skin of the tailgate. In a deployed position, the tailgate step extends from the tailgate and provides a step. The handle provides an assist device to aid a user in entering a bed of the vehicle in the deployed position. The tailgate step is designed to be hidden within the aesthetic features of the vehicle tailgate making it "invisible" to the user until it is needed. To activate the tailgate step and move it to the deployed position, the handle is lifted from a forward tailgate surface (i.e., the surface facing in toward a truck bed or toward a front of the vehicle when the vehicle tailgate is closed) and pulled toward a rear of the vehicle. The action of pulling the handle simultaneously lowers a step surface from a rearward face of the vehicle tailgate and raises the handle to provide the assist device. The lowered step surface provides an initial step that is parallel to the ground and positioned about halfway between the ground and a horizontal surface of the vehicle tailgate. Once the user has finished with the need for the step feature, the handle is lowered, thereby drawing the tailgate step back inside the vehicle tailgate to be hidden inside the vehicle tailgate.

Figure 1:
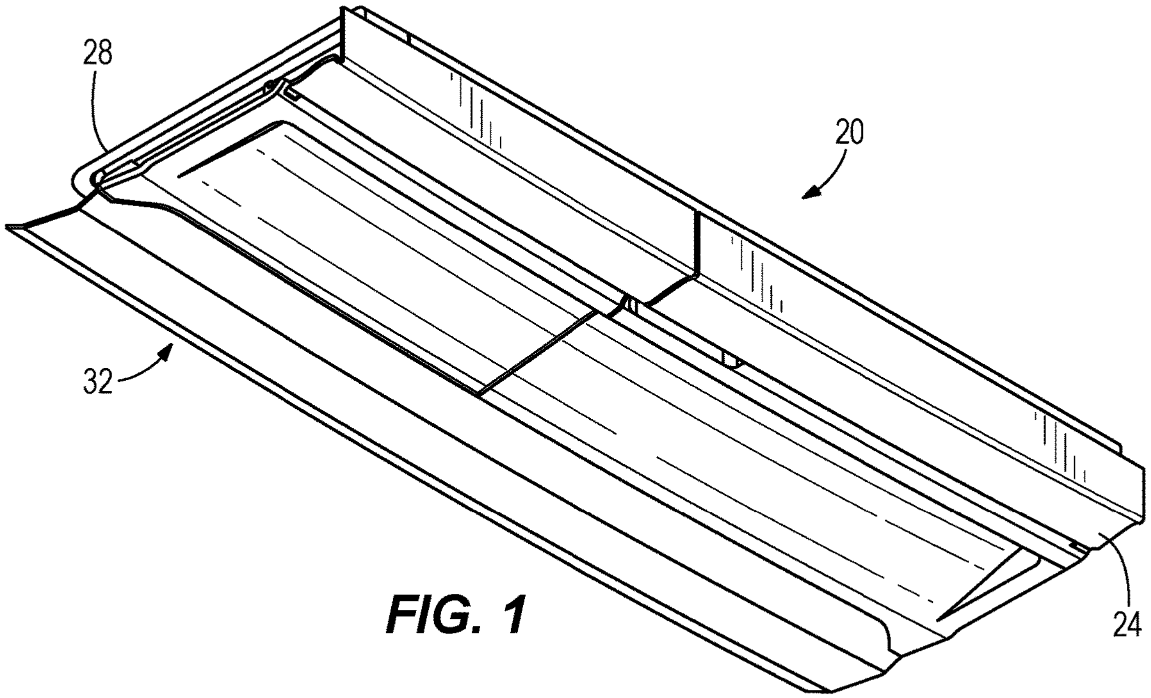
FIG. 1 is a top, left, rear perspective view of a vehicle tailgate, according to one implementation.
Figure 2:
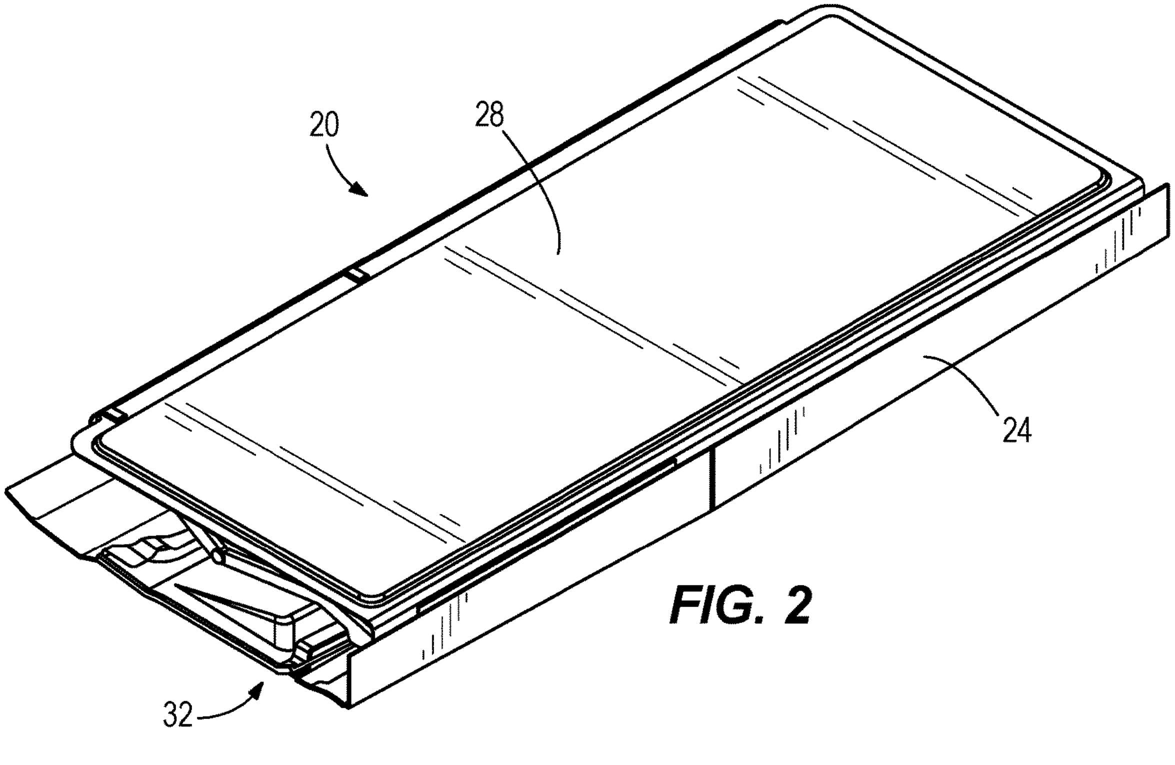
FIG. 2 is top, left, front perspective view of the vehicle tailgate of FIG. 1.

As shown in FIGS. 1 and 2, a vehicle tailgate 20 of a vehicle includes a tailgate skin 24, which includes decorative features and a tailgate frame 28 that provides structural support and rigidity to the vehicle tailgate 20. In some implementations, the vehicle includes a truck bed, and the vehicle tailgate 20 provides access to the truck bed. A tailgate step system 32 is connected to the tailgate frame 28 and is moveable between a stowed position (shown in FIGS. 1 and 2) and a deployed position (shown in FIGS. 13 and 14).

Figure 3:
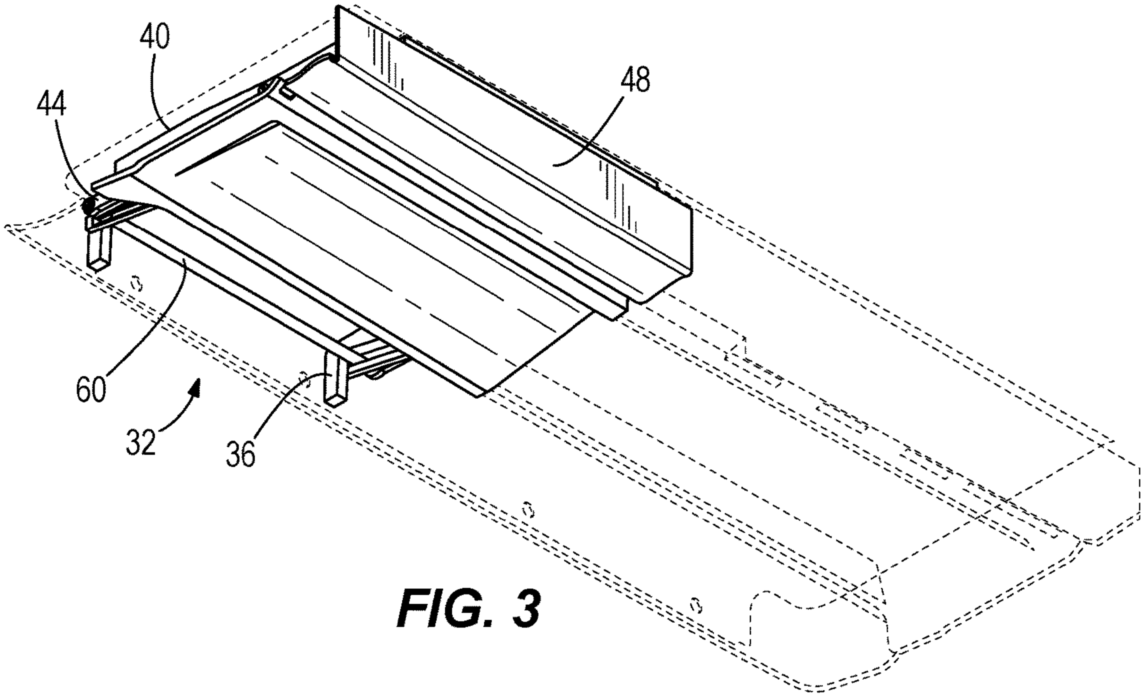
FIG. 3 is a top, left, rear perspective view of a tailgate step system of the vehicle tailgate of FIG. 1.
Figure 4:
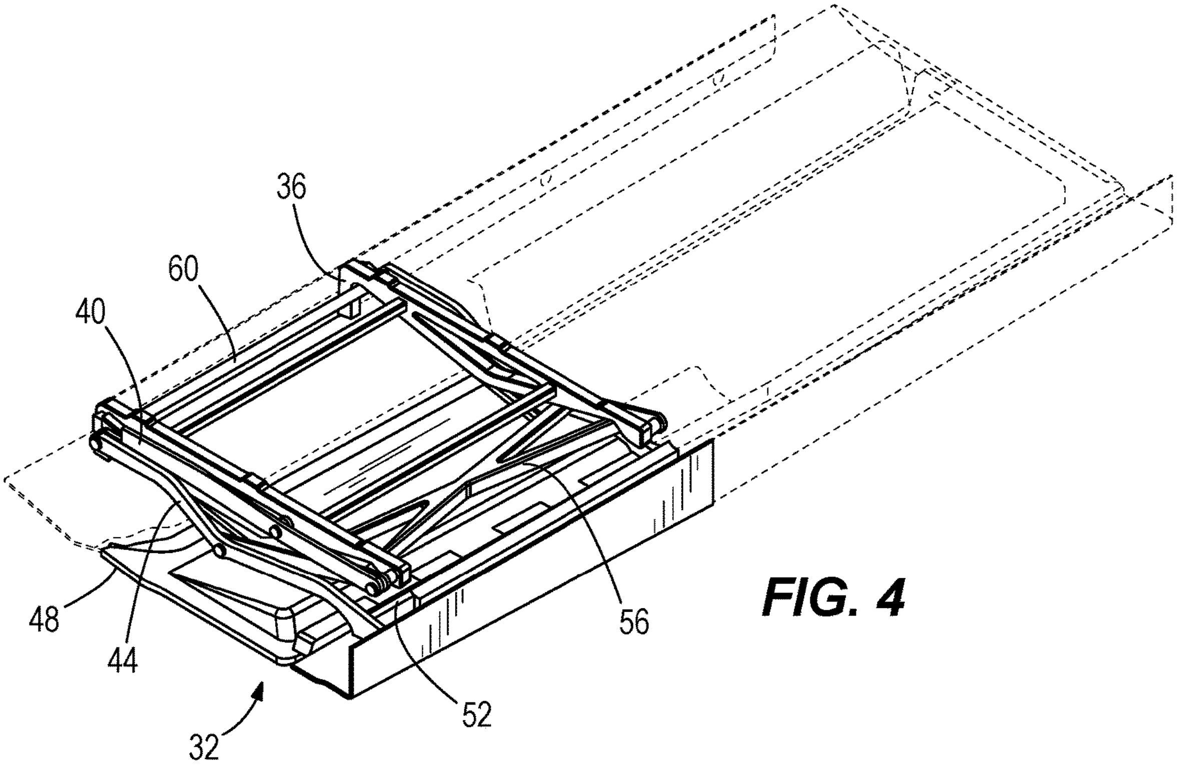
FIG. 4 is a top, left, front perspective view of the tailgate step system of FIG. 3.

As shown in FIGS. 3 and 4, the tailgate step system 32 includes a base frame 36 that rigidly connects to the tailgate frame 28, an actuation handle 40 that is structured to actuate the tailgate step system 32 between the stowed position and the deployed position, a step support link 44 that includes a step skin 48 that matches with (e.g., aligns, includes matching or coordinating graphics/symbols, colors, etc.) the tailgate skin 24, a step surface 52 that supports a user during use in the deployed position, and a rotating drive link 56 and a sliding drive link 60 that connect the actuation handle 40 and the step support link 44 via the base frame 36.

Figure 5:
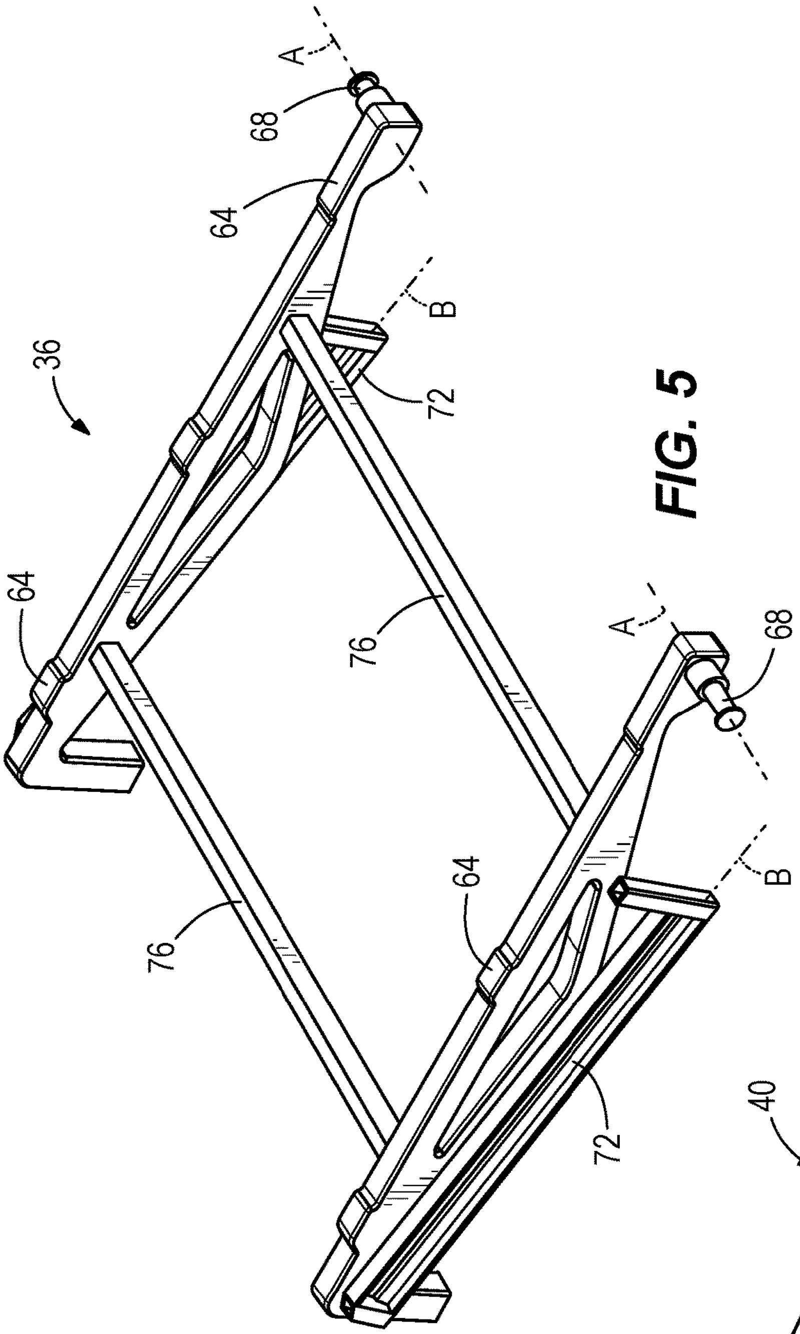
FIG. 5 is a perspective view of a base frame of the tailgate step system of FIG. 3, according to some implementations.

As shown in FIG. 5, the base frame 36 includes six mounting bosses 64 that are structured to connect to the tailgate frame 28 (e.g., via fasteners, welding, interference fit, etc.). In some implementations, more or less than six mounting bosses 64 are included. The base frame 36 also includes frame pins 68 and frame slides 72. The frame pins 68 define a frame pin axis A. The frame slides 72 each define a frame slide axis B. In some implementations, the frame pin axis A is oriented perpendicular to both the frame slide axes B, but the frame pin axis A does not intersect either frame slide axis B. The frame slides 72 are spaced apart by frame spacer bars 76. In some implementations, the base frame 36 is a rigid structure. For example, the base frame 36 may be formed as a weldment.

Figure 6:
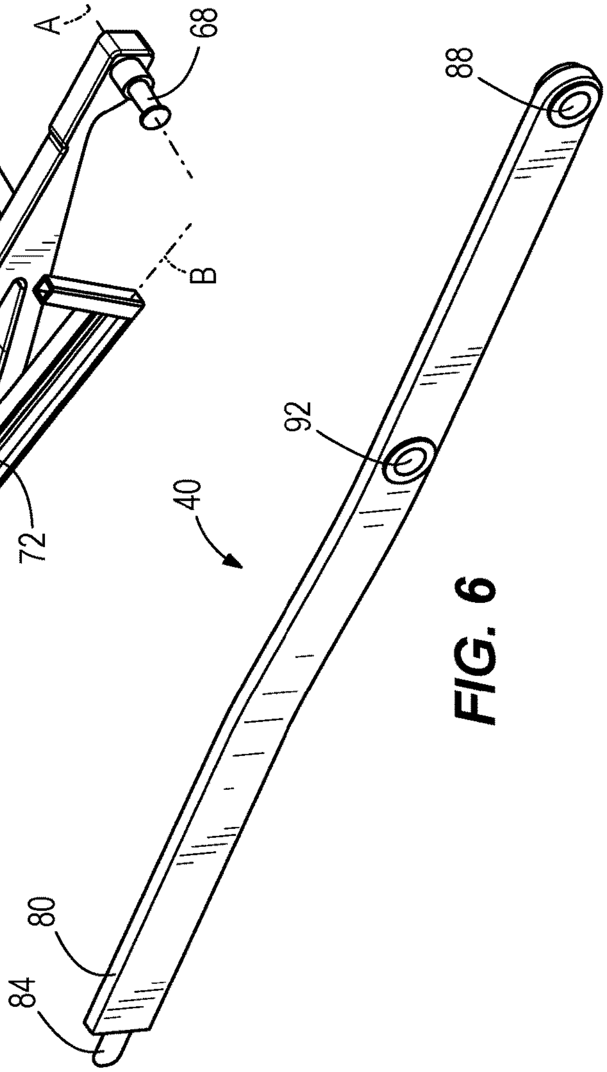
FIG. 6 is a perspective view of an actuation handle of the tailgate step system of FIG. 3.

As shown in FIG. 6, the actuation handle 40 includes a grip 80 structured to be grasped by a user. In some implementations, the grip 80 includes ergonomic features such as finger contours (not shown). A locking feature in the form of a button or lever 84 and a latching mechanism is arranged adjacent the grip 80 and is actuatable by the user. A handle-frame boss 88 is positioned adjacent an end of the actuation handle 40 opposite the grip 80, and a handle-link boss 92 is spaced apart from the handle-frame boss 88 toward the grip.

Figure 7:
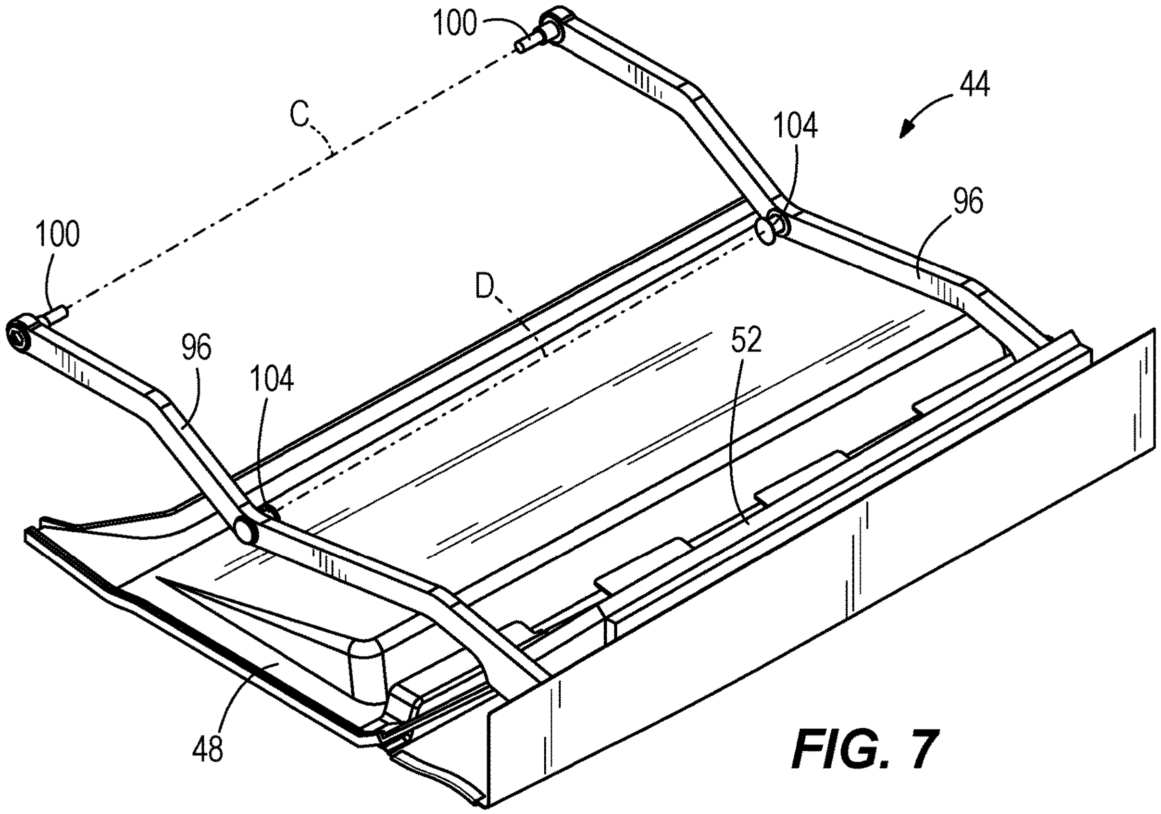
FIG. 7 is a top, left, front perspective view of a step support link of the tailgate step system of FIG. 3.
Figure 8:
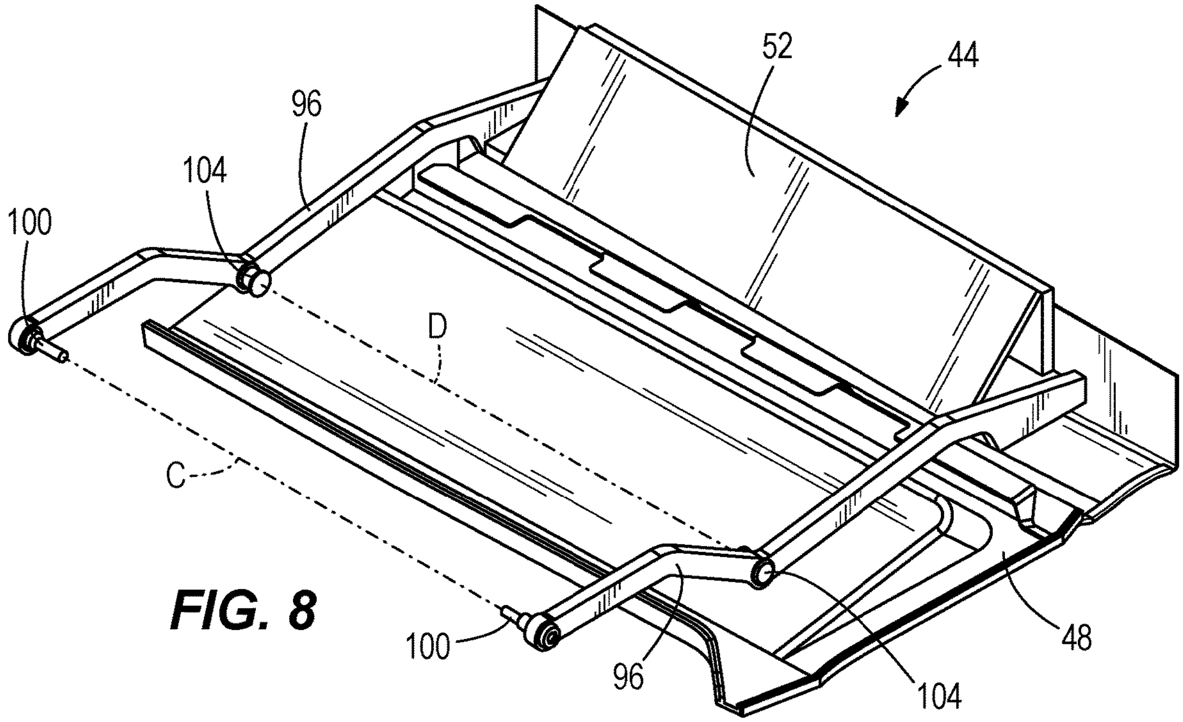
FIG. 8 is a bottom, left, front perspective view of the step support link of FIG. 7.

As shown in FIGS. 7 and 8, the step support link 44 includes two support arms 96 separated by the step surface 52. In some implementations, the support arms 96 and the step surface 52 are formed as a weldment. Each of the support arms 96 includes a sliding pin 100 aligned with a slide pin axis C. In some implementations, each sliding pin 100 is a fastener threaded through or extending through an aperture or hole formed in the respective support arm 96. Each of the support arms 96 also includes a rotation pin 104 aligned with a rotation pin axis D. Step skin 48 is connected to the step support link 44 and moves therewith. The step skin 48 is structured to match the tailgate skin 24 and blend into the vehicle tailgate 20 when the tailgate step system 32 is in the stowed position. In some implementations, the step surface 52 includes a non-slip surface.

Figure 9:
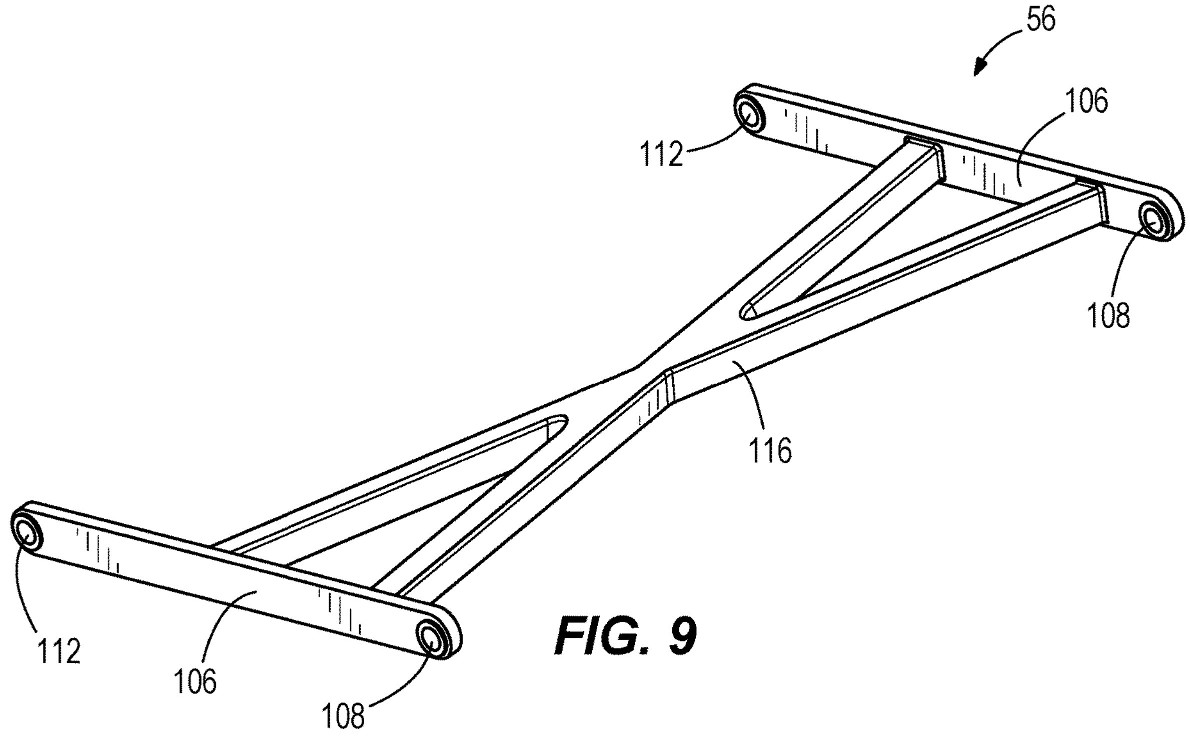
FIG. 9 is a perspective view of a rotating drive link of the tailgate step system of FIG. 3.

As shown in FIG. 9, the rotating drive link 56 includes two rotating drive link arms 106. Each rotating drive link arm 106 includes a drive-frame boss 108 structured to engage one of the frame pins 68 of the base frame 36 and a drive-support boss 112 structured to engage one of the rotation pins 104 of the step support link 44. The drive-frame boss 108 is spaced apart along a longitudinal axis of the rotating drive link arm 106 from the drive-support boss 112. For example, the drive-frame boss 108 is defined at a first end, and the drive-support boss 112 is defined at the second end that is opposite the first end along the longitudinal axis of the rotating drive link arm 106. A rigid link structure 116 connects the two rotating drive link arms 106.

Figure 10:
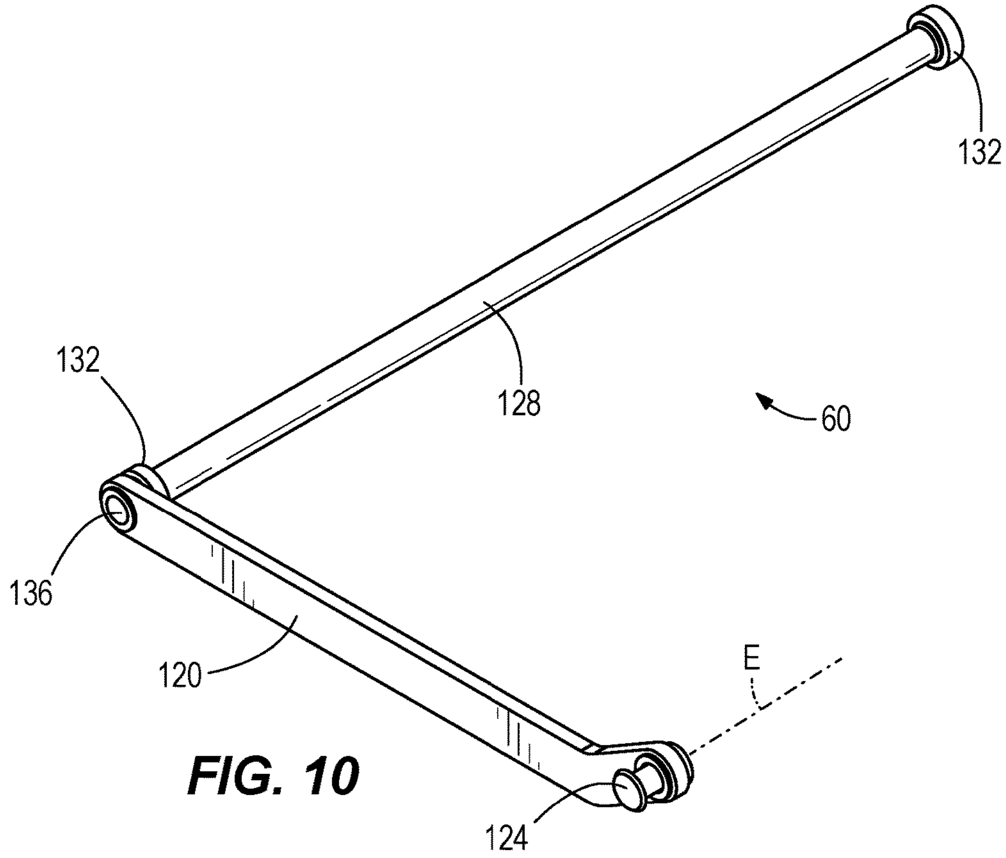
FIG. 10 is a perspective view of a sliding drive link of the tailgate step system of FIG. 3.

As shown in FIG. 10, the sliding drive link 60 includes a sliding drive link arm 120 including a link-handle pin 124 structured to engage the handle-link boss 92 and defining a link-handle axis E. A slide pin 128 is connected to the sliding drive link arm 120 concentric with the slide pin axis C. The slide pin 128 supports two bearings 132 (e.g., ball bearings, slide bearings, etc.). Slide pin apertures 136 are formed in the sliding drive link 60 (only one is visible on FIG. 10) and sized to receive the sliding pins 100 of the step support link 44.

Figure 11:
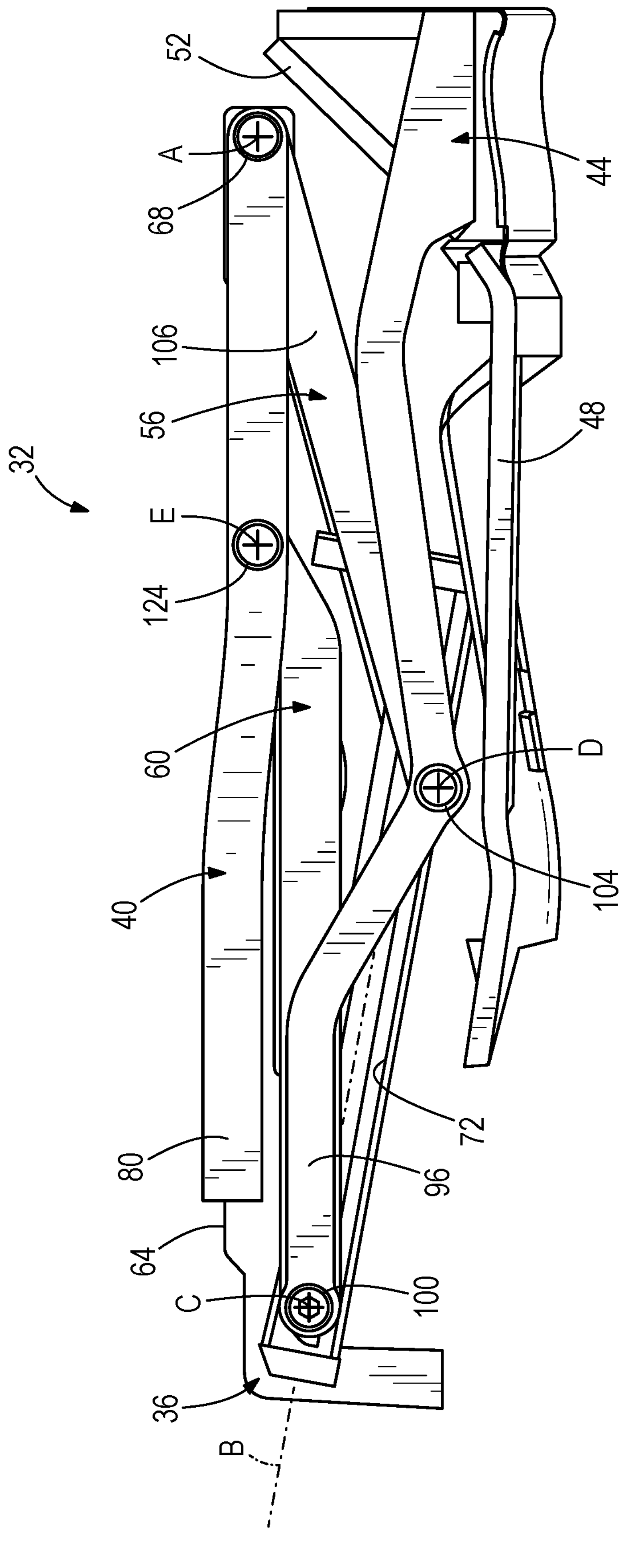
FIG. 11 is a side view of the tailgate step system of FIG. 3.
Figure 12:
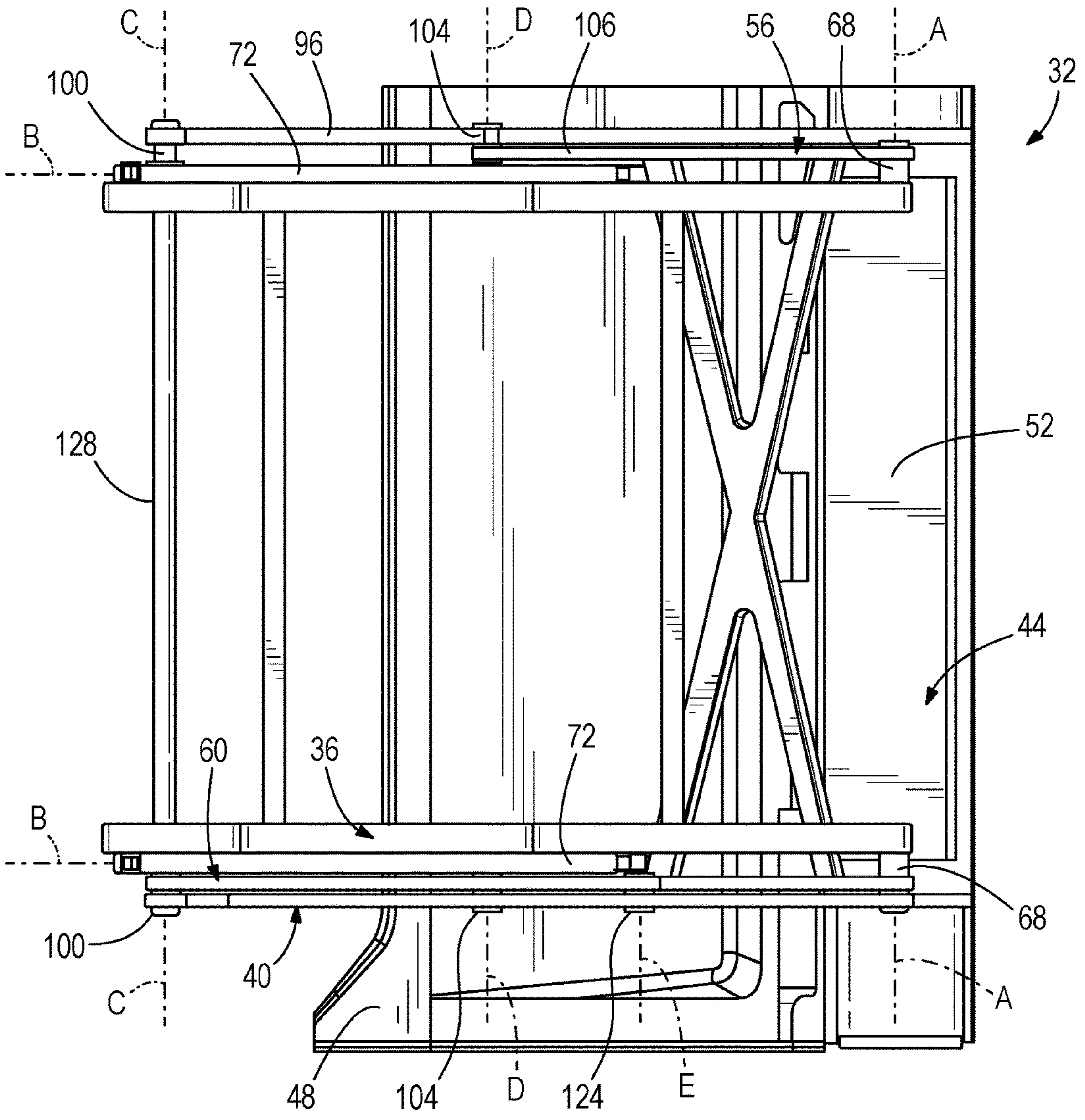
FIG. 12 is a front view of the tailgate step system of FIG. 3.

As shown in FIGS. 11 and 12, the tailgate step system 32 is assembled by connecting the sliding drive link 60 to the step support link 44 via the sliding pins 100, allowing rotation of the sliding drive link 60 relative to the support arms 96 about the slide pin axis C. The two bearings 132 are mounted on the slide pin 128 and are engaged with the frame slides 72, allowing the slide pin 128 to translate along the frame slide axis B. The slide pin axis C is arranged perpendicular to the frame slide axis B. In some implementations, the slide pin axis C intersects the frame slide axis B.

The rotating drive link 56 is connected to the step support link 44 via the rotation pins 104, allowing the rotating drive link 56 to rotate relative to the support arms 96 about the rotation pin axis D.

The sliding drive link 60 is connected to the actuation handle 40 via the link-handle pin 124, allowing rotation of the sliding drive link 60 relative to the actuation handle 40 about the link-handle axis E. The rotating drive link 56 is connected to the actuation handle 40 and the base frame 36 via the frame pins 68 so that the actuation handle 40 rotates relative to rotating drive link 56 and the base frame 36 about the frame pin axis A.

The locking feature of the actuation handle 40 includes the button or lever 84 and maintains the tailgate step system 32 in the stowed position shown in FIGS. 1, 2, 11, and 12 (for example during driving the vehicle).

Figure 13:
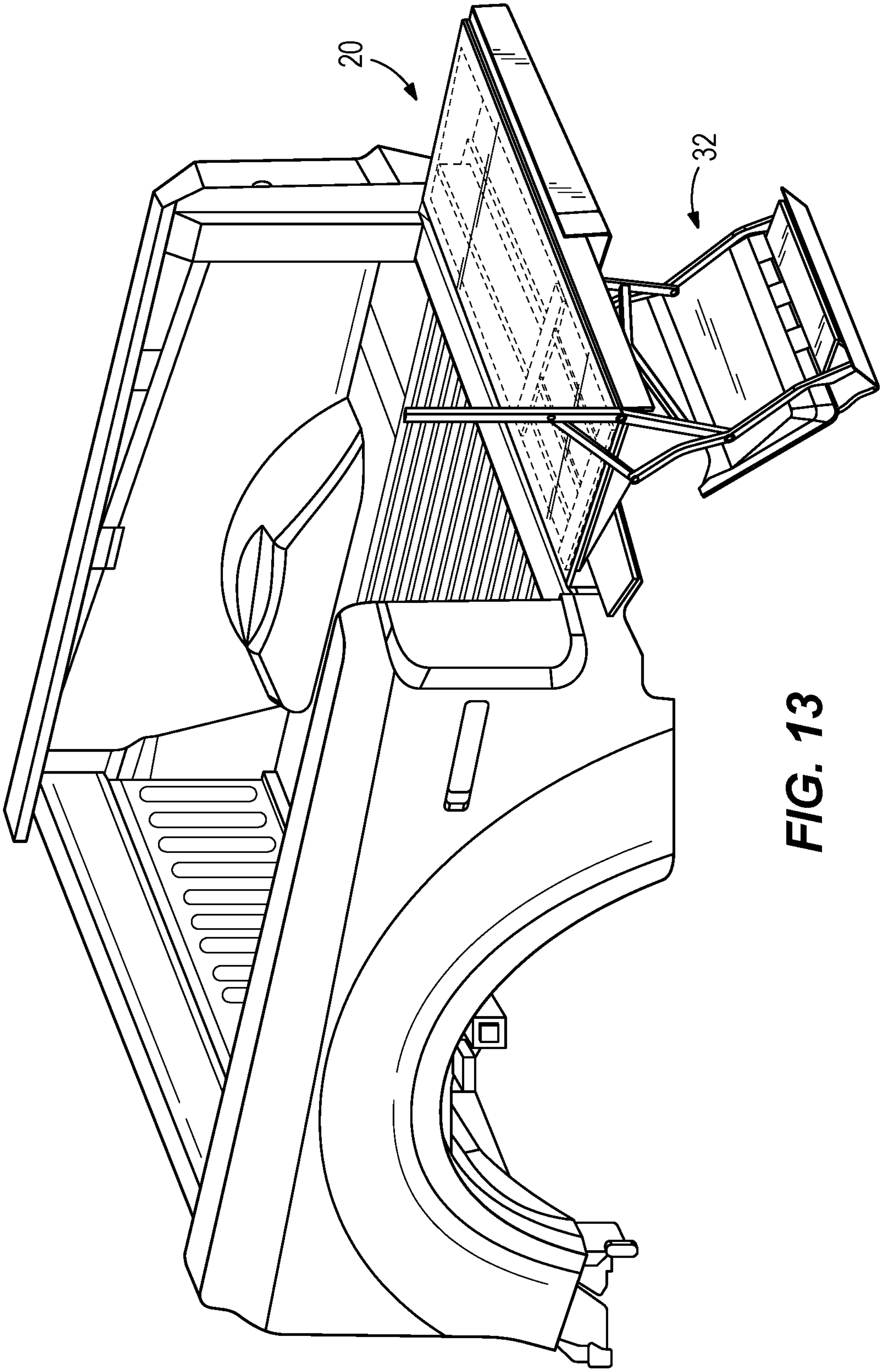
FIG. 13 is perspective view of the vehicle tailgate of FIG. 1 with the tailgate step system in a deployed position.
Figure 14:
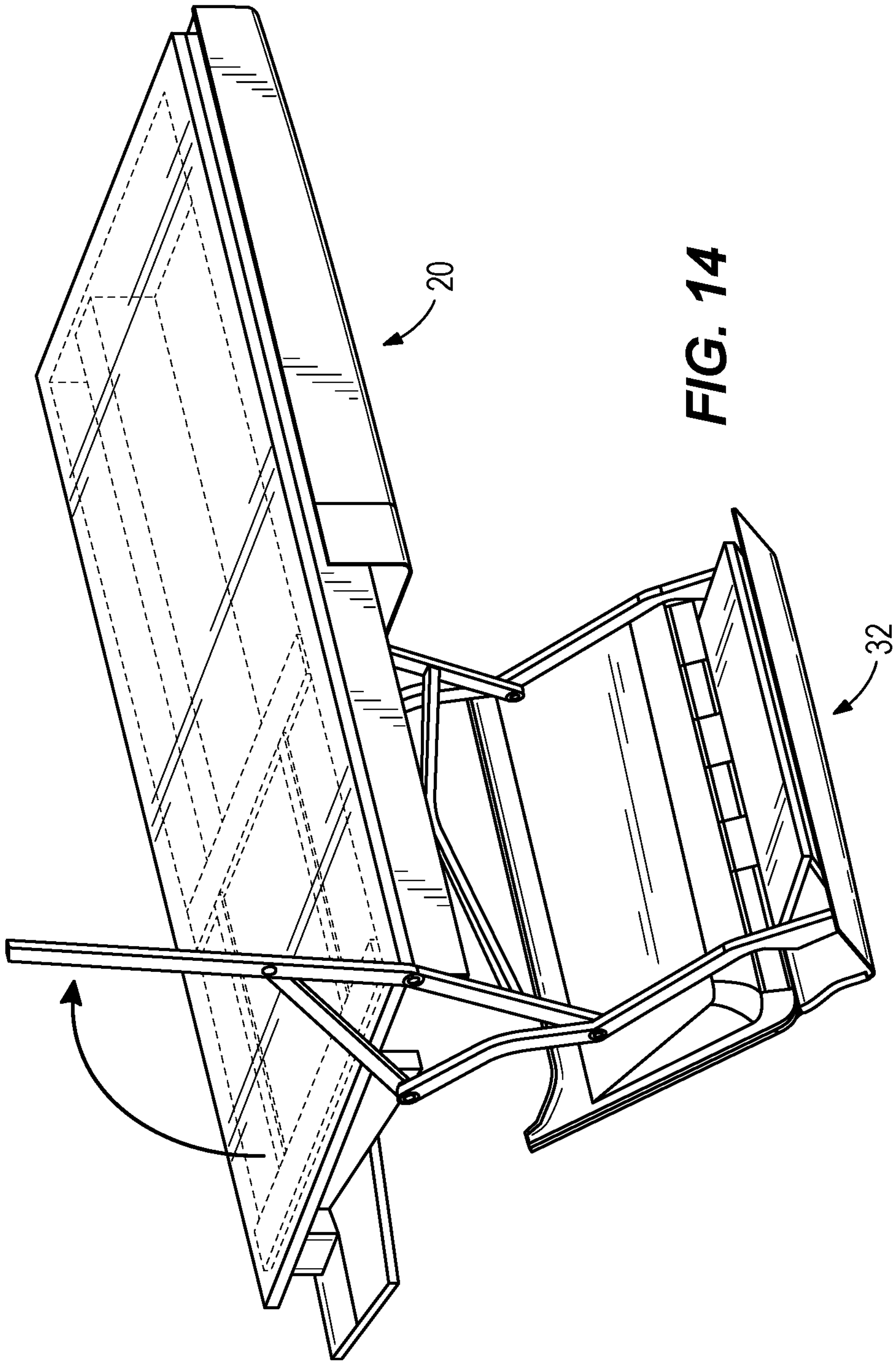
FIG. 14 is perspective view of the vehicle tailgate of FIG. 1 with the tailgate step system in the deployed position.

As shown in FIGS. 13 and 14, when the vehicle tailgate 20 is arranged in a lower position, the tailgate step system 32 can be moved from the stowed position to the deployed position so that the step surface 52 can be used to aid a user in entering a truck bed. The tailgate step system 32 operates as a four-bar linkage actuating between the stowed position (A) and the deployed position (B). In the deployed position, the actuation handle 40 locks in the upright position extending from the vehicle tailgate 20 and is graspable by the user as an assist device. When deployed, the step surface 52 extends from the vehicle tailgate 20 towards the ground. In some implementations, the step surface 52 extends rearward of the vehicle tailgate 20 when deployed increasing the ease with which a user can climb from the step surface 52 onto the vehicle tailgate 20 and into the truck bed.

For purposes of this description, certain advantages and novel features of the aspects and configurations of this disclosure are described herein. The described methods, systems, and apparatus should not be construed as limiting in any way. Instead, the present disclosure is directed toward all novel and nonobvious features and aspects of the various disclosed aspects, alone and in various combinations and sub-combinations with one another. The disclosed methods, systems, and apparatus are not limited to any specific aspect, feature, or combination thereof, nor do the disclosed methods, systems, and apparatus require that any one or more specific advantages be present or problems be solved.

Although the figures and description may illustrate a specific order of method steps, the order of such steps may differ from what is depicted and described, unless specified differently above. Also, two or more steps may be performed concurrently or with partial concurrence, unless specified differently above.

Features disclosed in this specification (including any accompanying claims, abstract, and drawings), and/or all of the steps of any method or process so disclosed, may be combined in any combination, except combinations where at least some of such features and/or steps are mutually exclusive. The claimed features extend to any novel one, or any novel combination, of the features disclosed in this specification (including any accompanying claims, abstract, and drawings), or to any novel one, or any novel combination, of the steps of any method or process so disclosed.

As used in the specification and the appended claims, the singular forms “a”, “an”, and “the” include plural referents unless the context clearly dictates otherwise. Ranges may be expressed herein as from “about” one particular value, and/or to “about” another particular value. When such a range is expressed, another aspect includes from the one particular value and/or to the other particular value. Similarly, when values are expressed as approximations, by use of the antecedent “about”, it will be understood that the particular value forms another aspect. It will be further understood that the endpoints of each of the ranges are significant both in relation to the other endpoint, and independently of the other endpoint. The terms “about” and “approximately” are defined as being “close to” as understood by one of ordinary skill in the art.

The terms “coupled”, “connected”, and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

Certain terminology is used in the following description for convenience only and is not limiting. The words "right", "left", "lower", and "upper" designate direction in the drawings to which reference is made. The words "inner" and "outer" refer to directions toward and away from, respectively, the geometric center of the described feature or device. The words "distal" and "proximal" refer to directions taken in context of the item described and, with regard to the instruments herein described, are typically based on the perspective of the practitioner using such instrument, with "proximal" indicating a position closer to the practitioner and "distal" indicating a position further from the practitioner. The terminology includes the above-listed words, derivatives thereof, and words of similar import.

Throughout the description and claims of this specification, the word "comprise" and variations of the word, such as "comprising" and "comprises", means "including but not limited to", and is not intended to exclude, for example, other additives, components, integers or steps. "Exemplary" means "an example of" and is not intended to convey an indication of a preferred or ideal aspect. "Such as" is not used in a restrictive sense, but for explanatory purposes.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

What is claimed is:

1. A tailgate step comprising:

an actuation handle configured to be pivotably coupled to a vehicle tailgate;

a drive link pivotably coupled to the actuation handle;

a step support link pivotably coupled to the drive link and configured to support a step skin; and a step surface coupled to and movable with the step support link between:

a stowed position in which the step surface is hidden and is configured to align the step skin with a tailgate skin of the vehicle tailgate, and a deployed position in which the actuation handle extends from the vehicle tailgate and is configured as an assist device.

2. The tailgate step of claim 1, wherein the drive link is a first drive link, further comprising a second drive link pivotably coupled between the step support link and the actuation handle.

3. The tailgate step of claim 2, further comprising a base frame including a frame pin defining a frame pin axis, wherein the second drive link is coupled to the actuation handle and the frame pin so that the actuation handle and the second drive link rotate relative to the base frame relative to the frame pin axis.

4. The tailgate step of claim 1, further comprising a base frame including a frame slide defining a frame slide axis, wherein the step support link is coupled to the drive link about a slide pin axis constrained on the frame slide axis by the frame slide.

5. The tailgate step of claim 4, wherein the drive link includes a bearing slidingly coupled to the frame slide.

6. The tailgate step of claim 1, wherein the step surface is configured to be parallel to a ground surface when in the deployed position.

7. The tailgate step of claim 1, wherein the actuation handle is configured to be recessed into a tailgate frame when in the stowed position.

8. The tailgate step of claim 1, wherein the tailgate step actuates between the stowed position and the deployed position using a four-bar linkage including the actuation handle, the drive link, and the step support link.

9. The tailgate step of claim 1, wherein the actuation handle includes a locking feature selectively maintaining the tailgate step in the stowed position or the deployed position.

10. A four-bar linkage tailgate step comprising:

an actuation handle configured to be pivotably mounted to a vehicle tailgate about a first axis and including a grip;

a rotating drive link rotatably coupled to the actuation handle about the first axis;

a step support link coupled to the rotating drive link; and a step surface coupled to the step support link, wherein the four-bar linkage tailgate step is arrangeable in a stowed position with the actuation handle and the step surface are within a tailgate skin, and wherein the four-bar linkage tailgate step is arrangeable in a deployed position with the actuation handle extending from the tailgate skin and providing an assist device, and the step surface extending from the tailgate skin.

11. The four-bar linkage tailgate step of claim 10, further comprising a sliding drive link rotatably coupled between the actuation handle about a link-handle axis and the step support link about a slide pin axis.

12. The four-bar linkage tailgate step of claim 11, further comprising:

a base frame including:

a frame pin defining a frame pin axis, the actuation handle and the rotating drive link coupled to the frame pin for rotation about the frame pin axis, and a frame slide defining a frame slide axis; and a bearing coupled to the sliding drive link about the slide pin axis, wherein the frame slide constrains the bearing to move along the frame slide axis.

13. The four-bar linkage tailgate step of claim 10, wherein the actuation handle is configured to be recessed into a tailgate frame when in the stowed position.

14. The four-bar linkage tailgate step of claim 10, wherein the actuation handle includes a locking feature selectively maintaining the four-bar linkage tailgate step in the stowed position or the deployed position.

15. The four-bar linkage tailgate step of claim 10, wherein the step support link is structured to support a step skin and to align the step skin with the tailgate skin when the four-bar linkage tailgate step is arranged in the stowed position.

16. A vehicle tailgate comprising:

a tailgate frame;

a tailgate skin covering the tailgate frame; and a tailgate step including:

a base frame rigidly coupled to the tailgate frame and including a frame pin defining a frame pin axis, and a frame slide defining a frame slide axis;

an actuation handle rotatably coupled to the frame pin;

a sliding drive link rotatably coupled to the actuation handle about a link-handle axis and including a bearing slidingly engaged with the frame slide and defining a slide pin axis;

a rotating drive link rotatably coupled to the frame pin; and a step support link rotatably coupled to the sliding drive link about the slide pin axis, and rotatably coupled to the rotating drive link about a rotation pin axis, the step support link including a step surface and a step skin, wherein the tailgate step is actuatable between a stowed position and a deployed position, wherein when arranged in the stowed position, the step skin is aligned with the tailgate skin and the actuation handle is recessed within the tailgate frame, and wherein when arranged in the deployed position, the actuation handle provides an assist device and the step surface is positioned below and rearward of the tailgate frame.

17. The vehicle tailgate of claim 16, wherein the actuation handle includes a locking feature selectively maintaining the tailgate step in the stowed position or the deployed position.

18. The vehicle tailgate of claim 16, wherein the frame pin axis is perpendicular to the frame slide axis.

19. The vehicle tailgate of claim 16, wherein the frame pin axis, the slide pin axis, the rotation pin axis, and the link-handle axis are parallel to and offset from one another.

20. The vehicle tailgate of claim 16, wherein the step surface is configured to be parallel to a ground surface in the deployed position.

* * * * *